(12) United States Patent
Phillips

(10) Patent No.: US 8,371,980 B2
(45) Date of Patent: Feb. 12, 2013

(54) VEHICLE LAUNCH DEVICE

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 12/892,020

(22) Filed: Sep. 28, 2010

(65) Prior Publication Data

US 2012/0077636 A1    Mar. 29, 2012

(51) Int. Cl.
*F16H 3/74*    (2006.01)
(52) U.S. Cl. ........................................... 475/258
(58) Field of Classification Search .................. 475/258, 475/259, 261, 293
See application file for complete search history.

(56) References Cited

U.S. PATENT DOCUMENTS

| | | | |
|---|---|---|---|
| 6,093,128 A | * | 7/2000 | Seith ............................. 475/258 |
| 2006/0068965 A1 | * | 3/2006 | Gumpoltsberger ........... 475/275 |

* cited by examiner

*Primary Examiner* — Edwin A Young
(74) *Attorney, Agent, or Firm* — Quinn Law Group, PLLC

(57) ABSTRACT

A launch device includes a planetary gear set having a first member, a second member, and a third member. An input member and an output member are operatively connectable for rotation with different ones of the members of the planetary gear set. A centripetal clutch, referred to herein as a first centripetal clutch, operatively connects two of the members of the planetary gear set and is configured to transmit torque with a torque capacity that decreases as a difference between the speed of rotation of the output member and the speed of rotation of the input member decreases.

14 Claims, 3 Drawing Sheets

VEHICLE LAUNCH DEVICE

TECHNICAL FIELD

The invention relates to a device for improving the launch of a vehicle.

BACKGROUND

Delivery of tractive force to vehicle wheels must be accomplished as smoothly as possible. For example, launching a vehicle to provide tractive force at the vehicle wheels should be done without abrupt changes in torque that will be noticeable to the vehicle occupants. A fluid coupling such as a torque converter may be used to provide such a "soft-lockup" launch. Torque converters are relatively large, and require a hydraulic supply to operate.

Limited slip differentials allow some angular velocity, also referred to as slip, between vehicle wheels, but lockup at a predetermined slip. A smooth lockup of the limited slip differential will smooth torque spikes to improve passenger comfort.

SUMMARY

A launch device includes a planetary gear set having a first member, a second member, and a third member. An input member and an output member are operatively connectable for rotation with different ones of the members of the planetary gear set. A centripetal clutch, referred to herein as a first centripetal clutch, operatively connects two of the members of the planetary gear set and is configured to transmit torque with a torque capacity that decreases as a difference between the speed of rotation of the output member and the speed of rotation of the input member decreases. Due to the planetary gear set, the centripetal forces vary primarily with the difference between the input speed and the output speed, rather than with either speed alone. Thus, the torque capacity of the device drops sharply as the output speed approaches the input speed. This provides a fluid-coupling like launch feel, unlike a hard lockup of a simple centripetal device. Because a centripetal clutch is a passive device (i.e., it does not require electronic or hydraulic control), the device may be marginally less expensive than a torque converter. It may also be lighter and smaller. If used in a passive, limited slip differential, then the centripetal clutch may provide a faster, more consistent performance than a gerotor pump system, as a hydraulic supply and the buildup of hydraulic pressure is not necessary.

A set of intermeshing gears or an additional planetary gear set may be used, with the centripetal clutch positioned between these and the first planetary gear set, to create a true differential speed and zero torque at the synchronization of the input and output speeds of the centripetal clutch. An additional centripetal clutch may be positioned between the input member and one of the members of the planetary gear set. Torque smoothing during a neutral idle state, i.e., when the engine is rotating but the vehicle wheels are stopped, is accomplished by this additional centripetal clutch, allowing the first centripetal clutch to more closely approach zero torque at lock-up. Offset springs may also be used to hold back centripetal elements in the centripetal clutch until a predetermined speed of rotation of the driven member of the clutch is reached. This ensures very low torque capacity of the centripetal clutch at idle stall, providing a passive neutral idle effect.

The above features and advantages and other features and advantages of the present invention are readily apparent from the following detailed description of the best modes for carrying out the invention when taken in connection with the accompanying drawings.

DETAILED DESCRIPTION

Figure 1:
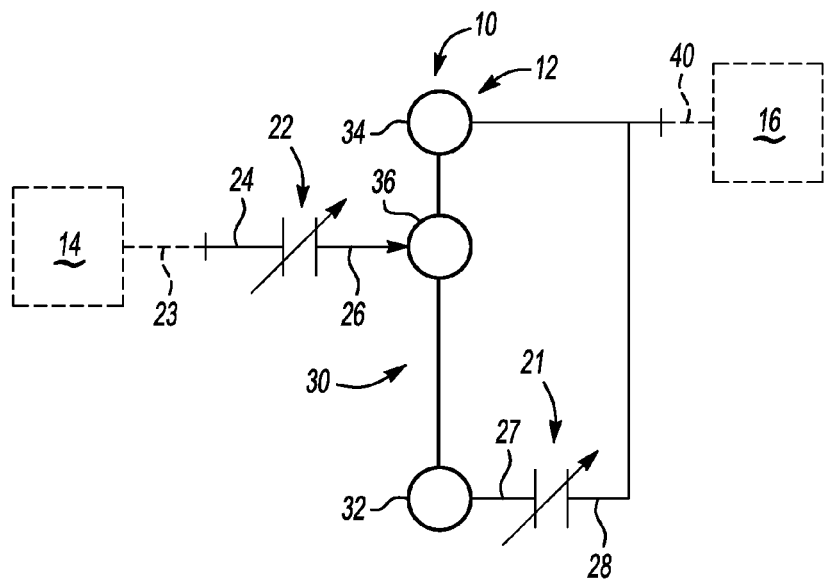
FIG. 1 is a schematic illustration of a first embodiment of a powertrain having a first embodiment of a launch device with two centripetal clutches and a planetary gear set shown in lever diagram form.

Referring to the drawings, wherein like reference numbers refer to like components throughout the several views, FIG. 1 shows a powertrain 10 of a vehicle. A launch device 12 is shown coupled between an engine 14 and a transmission 16 included in the powertrain 10, both of which are shown in phantom. The launch device 12 includes a first centripetal clutch 21, a second centripetal clutch 22, and a planetary gear set 30. The centripetal clutches 21, 22 and the planetary gear set 30 are connected between the engine 14 and the transmission 16 to passively provide neutral idle functionality at or below idle speed and a fluid-coupling like reduction of torque near synchronous speed, as further described below. The launch device 12 is "passive" in that it is purely mechanical, requiring no electronic controls. Although shown packaged between an engine 14 and a transmission 16, the launch device 12 may be used to transmit torque between any input and output at a reduced capacity at lock-up.

The planetary gear set 30 includes a sun gear member 32, a ring gear member 34 and a carrier member 36, which are referred to herein respectively as a third member, a second member and a first member. An engine output member 23, such as a crankshaft, is operatively connectable to the carrier member 36 through the centripetal clutch 22. The centripetal clutch 22 has a drive member 24 connected for rotation with the engine output member 23 and a driven member 26 connected for rotation with the carrier member 36. Similarly, the centripetal clutch 21 has a drive member 27 connected for rotation with the sun gear member 32 and a driven member 28 connected for rotation with both the ring gear member 34 and a transmission input member 40. In other embodiments not shown, the first member of the planetary gear set 30 may be a member other than the carrier member 36, the second member of the planetary gear set 30 may be a member other than the ring gear member 34, and the third member of the planetary gear set 30 may be a member other than the sun gear member 32.

Figure 2:
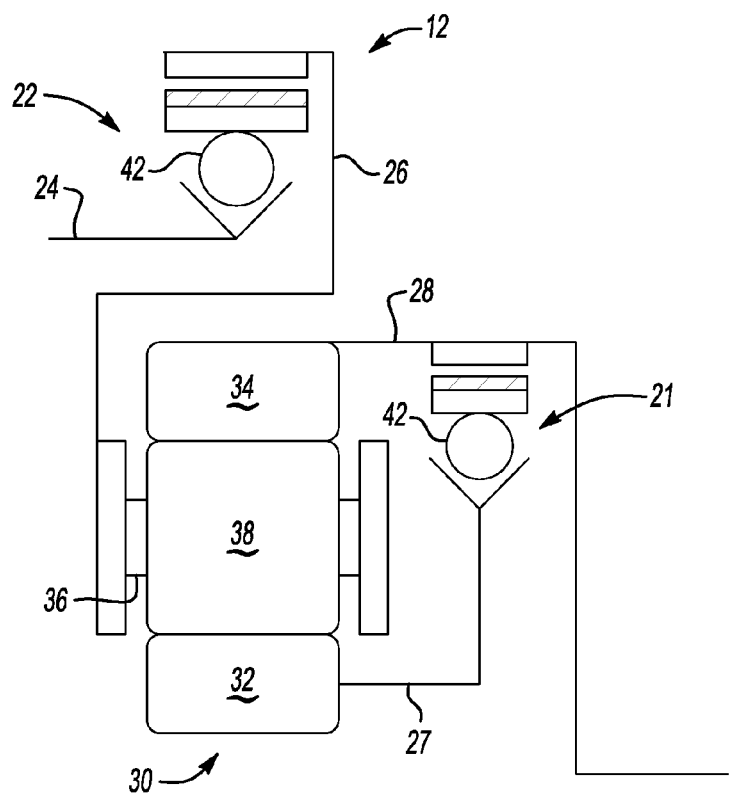
FIG. 2 is a schematic illustration of the launch device of FIG. 1 in a schematic partial cross-sectional illustration.

Referring to FIG. 2, the launch device 12 is shown in greater detail. The planetary gear set 30 includes planet gears 38, also referred to as pinion gears, which are supported for rotation on the carrier member 36 and mesh with both the sun gear member 32 and the ring gear member 34. Both of the centripetal clutches 21, 22 include pivotable arms 42 that are configured to cause torque flow through the respective clutches 21, 22 under certain conditions and at various torque capacities, as explained herein.

Figure 4:
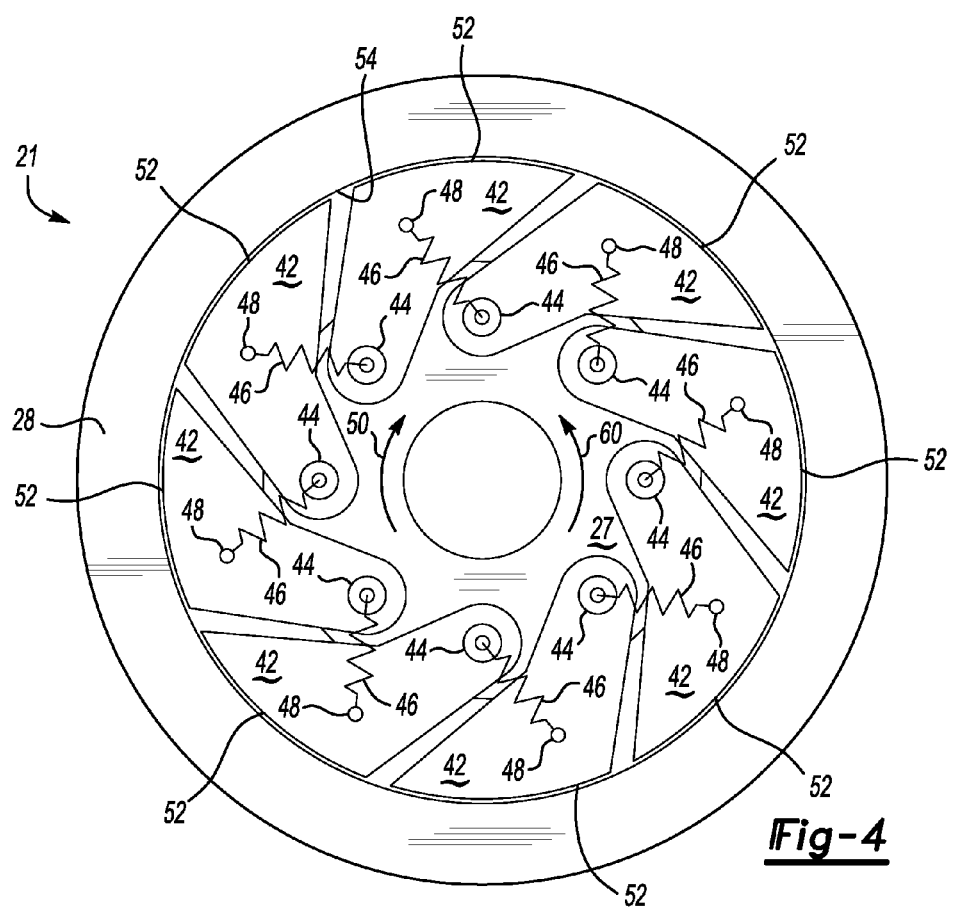
FIG. 4 is a schematic illustration of one of the centripetal clutches of FIG. 1.

Referring to FIG. 4, the centripetal clutch 21 is shown in side view. The arms 42 are connected at pivot pins 44 to the drive member 27 which rotates at the same speed as the sun gear member 32 of FIGS. 1 and 2. A respective biasing member, referred to herein as an offset tension spring 46 is connected to each pivot pin 44 and to a portion 48 of the respective adjacent arm 42. The tension springs 46 bias the arms 42 inward toward the drive member 27 and away from the driven member 28, which rotates at the same speed as the ring gear member 34. The drive member 27 may be an integral axial extension of the sun gear member 32 and the driven member 28 may be an integral axial extension of the ring gear member 34. When the sun gear member 32 rotates in a first direction of rotation 50, indicated by a clockwise arrow, centrifugal force causes the arms 42 to pivot outward away from the drive member 27. If the ring gear member 34 is also rotating in the direction of rotation 50 but at a slower speed than the sun gear member 32, or is rotating in an opposing direction of rotation, and if the speed differential between the drive member 27 and the driven member 28 is great enough so that the centrifugal force of the arms 42 overcome the biasing force of the springs 46, ends 52 of the arms 42 will engage an inner surface 54 of the driven member 28. The torque capacity of the centripetal clutch 21 increases or decreases as the speed differential of the input of the planetary gear set 30 (i.e., the carrier member 36) and the output of the planetary gear set 30 (i.e., the ring gear member 34) increases or decreases. Specifically, the torque capacity ($CAP_{DIFF}$) of the centripetal clutch 21 varies substantially according to the square of the speed differential of the drive carrier member 36 and the ring gear member 34:

$CAP_{DIFF} = (RPM_{DIFF}/K_{DIFF})^2$, where $RPM_{DIFF}$ is the speed of the sun gear member 32 and $K_{DIFF}$ is a constant referred to as a K-factor of the centripetal clutch 21.

The speed $RPM_{DIFF}$ of the sun gear member 32 (i.e., the differential node) is:

$RPM_{DIFF} = RPM_{IN} + R/S*(RPM_{IN} - RPM_{OUT})$, where $RPM_{IN}$ is the speed of the carrier member 36, $RPM_{OUT}$ is the speed of the ring gear member 34, R is the number of teeth of the ring gear member 34 and S is the number of teeth of the sun gear member 32.

At relatively low speed differentials between the drive member 27 and the driven member 28, there will be some slip between the ends 52 of the arms 42 and the inner surface 54, causing the torque capacity to be lower than at greater speed differentials. Slip will decrease as the speed differential between the drive member 27 and the driven member 28 increases until the drive member 27 and the driven member 28 are rotating at the same speed. At that point, the planetary gear set 30 will be "locked", meaning that the sun gear member 32, the ring gear member 34 and the carrier member 36 will all rotate at the same speed.

Referring again to FIG. 4, when the drive member 27 (and thus the sun gear member 32 of FIGS. 1 and 2) rotates in an opposing direction of rotation 60 shown as a counter-clockwise direction in FIG. 4, and the driven member 28 (and thus the ring gear member 34 of FIGS. 1 and 2) rotates in the clockwise direction or rotates in the counter-clockwise direction but at a slower speed of rotation than the drive member 27, then centripetal clutch 21 is in an overrunning state in which the ends 52 of arms 42 do not contact the inner surface 54 of the driven member 28 sufficiently to transmit any torque across the centripetal clutch 21.

Referring again to FIG. 1, the centripetal clutch 22 is structured similarly to that of centripetal clutch 21 described above, with arms 42, pivot pins 44 and offset springs 46, except the drive member is drive member 24 and the driven member is driven member 26. The drive member 24 rotates at the same speed as the engine output member 23 and the driven member 26 rotates at the same speed as the carrier member 36. Thus, when the engine output member 23 rotates faster than the carrier member 36 in the direction of rotation causing the arms of the centripetal clutch 22 to swing outward sufficiently to overcome the offset springs 46, then the centripetal clutch 22 transmits torque from the engine output member 23 to the carrier member 26 at a torque capacity that varies substantially in accordance with the square of the relative speed of the engine output member 23 to the carrier member 36. Specifically, the torque capacity ($CAP_{IN}$) of the centripetal clutch 22 is:

$CAP_{IN} = (RPM_{IN}/K_{IN})^2$, where $RPM_{IN}$ is the speed of the input member 24 and $K_{IN}$ is a constant referred to as a K-factor of the centripetal clutch 22.

Figure 3:
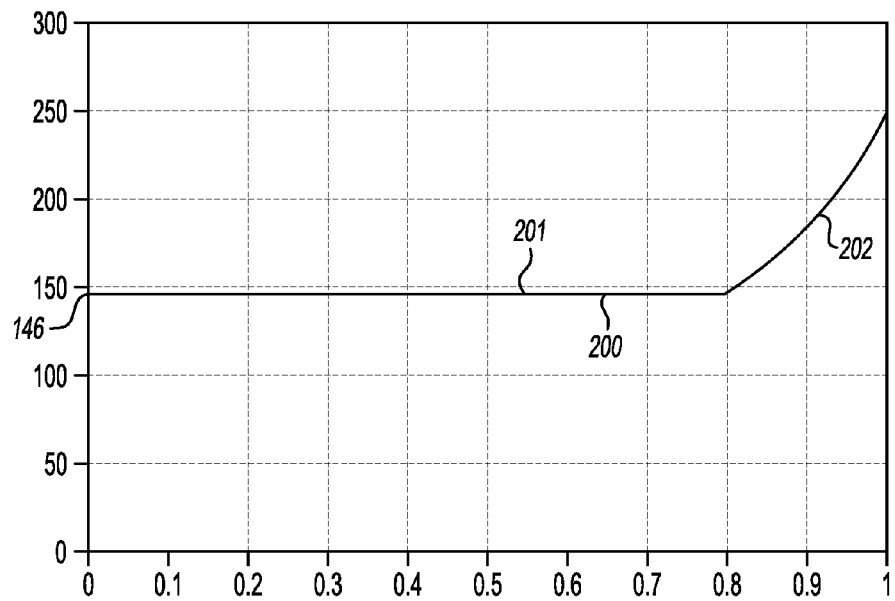
FIG. 3 is a chart of the K-Factor of the launch device versus the speed ratio of output of the launch device to the input of the launch device.

Referring to FIG. 3, a representative plot of K-factor versus speed ratio for the powertrain 10 with launch device 12 is shown. K-factor of the launch device 12 is indicated on the Y-axis. The K-factor is the ratio of the speed of the engine output member 23 in revolutions per minute divided by the square root of the torque in Newton-meters at the transmission input member 40. Thus, the K-factor is an indication of the efficiency of the launch device 12 in transmitting engine torque to the transmission input member 40. The K-factor is indicated by curve 200 and varies with the speed ratio (i.e., the speed of the transmission input member 40 relative to the speed of the engine output member 23). The curve 200 assumes that the ratio of the number of teeth of the ring gear member 34 of FIGS. 1 and 2 to the sun gear member 32 is 3.5.

As shown in FIG. 3, the K-factor indicates that the powertrain 10 has a stall at a K-factor of 146. At speed ratios up to 0.8, the centripetal clutch 22 slips as the transmission input member 40 gains speed. At stall (i.e., when the transmission input member 40 and the ring gear member 34 are not moving), most of the relative motion is between the ring gear member 34 and the carrier member 36. This causes the sun gear member to rotate at a relatively high speed so that clutch 21 has a relatively high torque capacity and clutch 21 slips (i.e., has a low torque capacity). During this portion of the curve 200, indicated as 201, the drive member 27 rotates in a direction 50 shown in FIG. 4 at a speed greater than the speed of the driven member 28, so the centripetal clutch 21 transmits torque without slip. The sun gear member 32 rotates at a speed proportional to the difference between the speed of rotation of the carrier member 36 and the ring gear member 34. At stall, the speed ratio of the clutch 21 with respect to input speed at drive member 24 and the mechanical advantage of the output torque are increased by a ratio of:

R/S+1; where R is the number of teeth of the ring gear member 34 and S is the number of teeth of the sun gear member 32.

Thus, the rotating masses required to generate equivalent output torque can be an order of magnitude smaller. Assuming that the ratio of the ring gear member 34 to the sun gear member 32 is 3.5, then the K-factor of the launch device 12 is 146 and the K-factor of the clutch 21 is 525.

As launch progresses between the speed ratio of 0.8 to 1.0 (shown at the portion 202 of curve 200), the speed differential between the ring gear member 34 and the carrier member 36 decreases, and the speed of the sun gear member 32 likewise decreases. Because the driven member 28 rotates at a speed of the ring gear member 34 and the transmission input member 40, the torque capacity of the centripetal clutch 21 declines between the speed ratios 0.8 to 1.0 (i.e., the centripetal clutch 21 slips). Thus, as the speed ratio approaches 1.0 (completion of launch), the torque capacity of the centripetal clutch 21 synchronously drops to zero. This gives the launch the same smooth feel as a fluid-coupling torque converter, unlike the hard lock-up of a simple centripetal clutch without the ability to leverage the speed differential of a planetary gear set. Relative to a hydraulic fluid coupling, the launch device 12 may be marginally lighter, smaller, and less expensive, and does not require any hydraulic controls (i.e., is passive). The relative direction of slip of the clutch 21 reverses as soon as the driven member 28 rotates faster than the drive member 27 (i.e., as soon as the clutch 21 overruns 0). The torque capacity of the clutch 21 does not fall to zero, however, until a higher (even more overrunning) speed ratio.

The springs 46 may be designed to provide a spring force that holds back the arms 42 from engagement with the driven member 28 at idle stall (i.e., when transmission input member 40 is not yet moving, ensuring that there is zero or very low torque capacity at idle stall, producing a passive "neutral idle" effect). Alternatively, the springs 46 of the centripetal clutch 22 may be designed to hold back engagement of the arms at idle stall so that the centripetal clutch 22 has zero or low torque capacity at idle stall.

Figure 5:
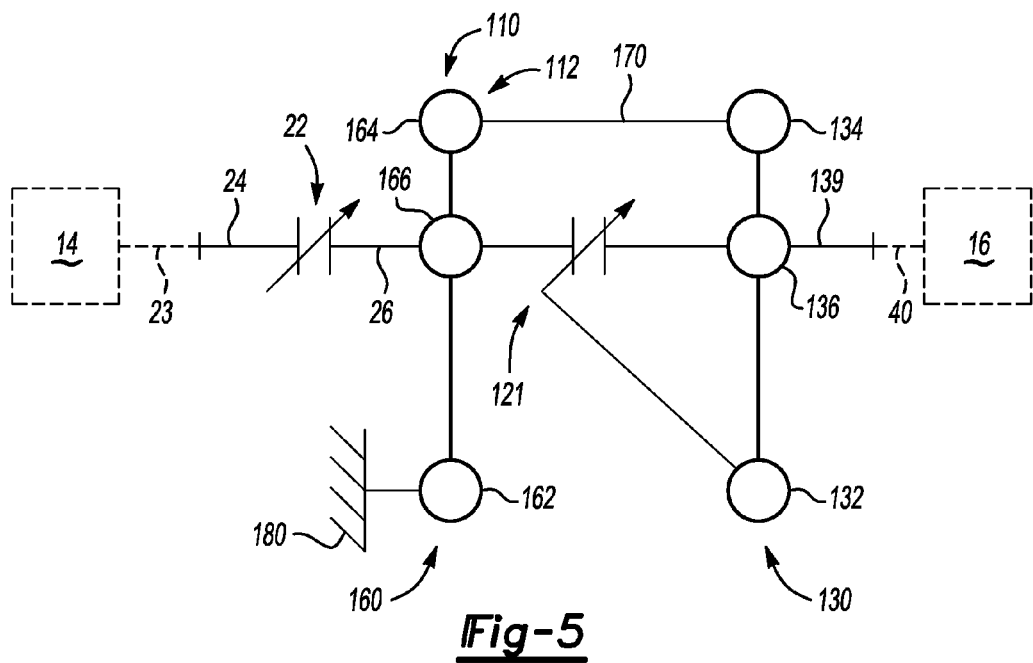
FIG. 5 is a schematic illustration of a second embodiment of a powertrain having a second embodiment of a launch device with two centripetal clutches and two planetary gear sets shown in lever diagram form.

Referring to FIG. 5, a powertrain 110 has a different embodiment of a launch device 112 connected between the engine output member 23 of engine 14 and the transmission input member 40 of transmission 16. The launch device 112 utilizes a first centripetal clutch 121 arranged differently than centripetal clutch 21 of FIGS. 1 and 2. The launch device 112 also includes centripetal clutch 22 configured and functioning the same as centripetal clutch 22 of FIGS. 1 and 2. The centripetal clutch 22 transmits torque when the drive member 24 rotates faster than the driven member 26 assuming the spring force of any offset springs similar to offset springs 46 of FIG. 4 are overcome.

Figure 6:
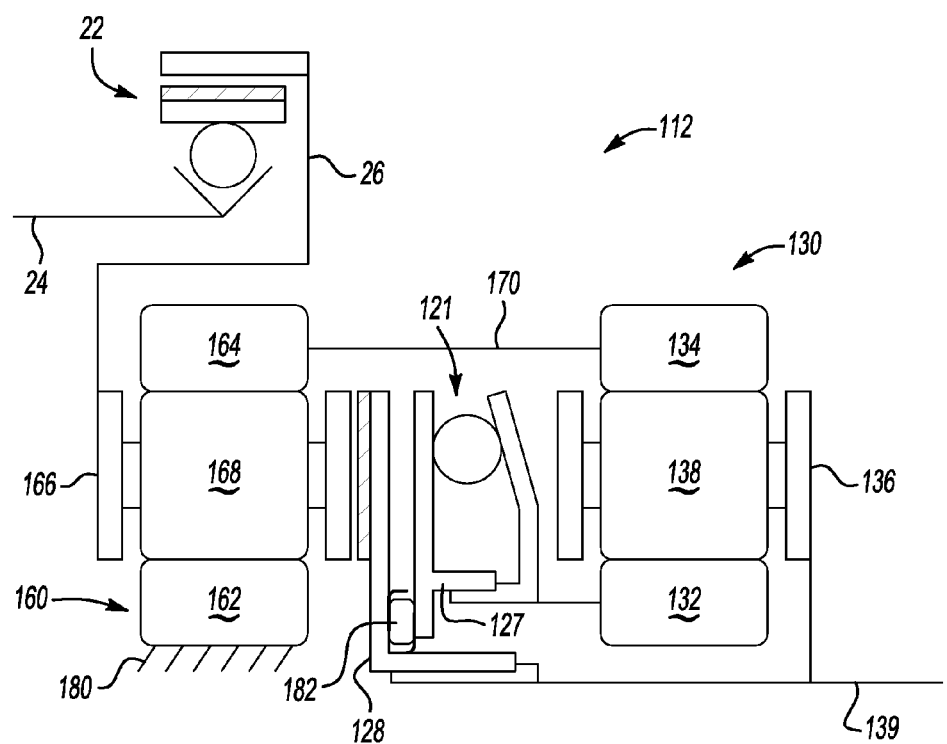
FIG. 6 is a schematic illustration of the launch device of FIG. 5 in a schematic partial cross-sectional illustration.

The launch device 112 includes a first planetary gear set 130 and a first set of intermeshing gears 160. In the embodiment of FIGS. 5 and 6, the first set of intermeshing gears 160 is another planetary gear set. In other embodiments, a layshaft arrangement could be used for the first set of intermeshing gears. The first set of intermeshing gears 160 includes a ring gear member 164 connected via an interconnecting member 170 for common rotation with ring gear member 134 of the planetary gear set 130. The driven member 26 of centripetal clutch 22 is connected for common rotation with carrier member 166 of the first set of intermeshing gears 160. A sun gear member 162 of the first set of intermeshing gears is grounded to a stationary (non-rotating) member 180, such as a transmission casing. The carrier member 166 is also referred to herein as the first gear member, and the ring gear member 164 is referred to as the second gear member. As shown in FIG. 6, planet gears 168, also referred to as pinion gears, are supported for rotation on the carrier member 166 and mesh with both the sun gear member 162 and the ring gear member 164.

A carrier member 136 of the planetary gear set 130 is connected for common rotation with an output member 139 of the launch device 112 and with the transmission input member 40. The ring gear member 134 is referred to as the first member of the planetary gear set 130, the carrier member 136 is referred to as the second member, and the sun gear member 132 is referred to as the third member. Planet gears 138, also referred to as pinion gears, are supported for rotation on the carrier member 136 and mesh with both the sun gear member 132 and the ring gear member 134.

The centripetal clutch 121 has a drive member 127 splined for common rotation with the sun gear member 132. The centripetal clutch has a driven member 128 splined for common rotation with the carrier member 136, which is the output member of the launch device 112. When the drive member 127 rotates faster than the driven member 128 in the same direction of rotation, centripetal force is applied axially through bearing 182 to the driven member 128 of the centripetal clutch 121. The driven member 128 is also moved axially by the centripetal force to engage with the carrier member 166. If the output member of the launch device 112 (carrier member 136) rotates faster than the sun gear member 132, the clutch 121 will overrun.

At the beginning of launch, after the neutral idle effect of any offset springs in clutch 22 is overcome, the speed of the output member 139 slowly increases from a stopped position. The clutch 22 initially has a large torque capacity that begins to slip and goes to zero capacity as the speed of the output member 139 approaches the speed of the input member 24, with the speed of the sun gear member 132 dropping to zero and the torque capacity of the clutch 121 likewise dropping to zero, resulting in zero torque at synchronization of input speed with output speed for smooth drive to coast transitions.

Because the launch device 112 has both a set of intermeshing gears (planetary gear set 160) and a planetary gear set 130, the speed of the sun gear member 132 is proportional to the difference in speed of the input member of the launch device 112 (i.e., the speed of the carrier member 136) and the speed of the output member 139 of the launch device 112 (i.e., the speed of the carrier member 166).

Similar to launch device 12 of FIGS. 1 and 2, the centripetal clutch 22 may have offset springs designed to provide a spring force that holds back the arms of the clutch from engagement with the driven member 26 at idle stall (i.e., when transmission input member 40 is not yet moving, ensuring that there is zero or very low torque capacity at idle stall, producing a passive "neutral idle" effect). After the spring force is overcome, the centripetal clutch 22 will have a large torque capacity during relatively low speed ratios across the launch device 112.

The device 112 may be used as a passive, limited-slip differential in the final drive portion of a vehicle drive train between two front wheels or two rear wheels to provide faster-reacting, more consistent performance than a similar gerotor pump system which depends on hydraulic fluid pressure generated by the differential housing to create a clutch force for torque transfer.

While the best modes for carrying out the invention have been described in detail, those familiar with the art to which this invention relates will recognize various alternative designs and embodiments for practicing the invention within the scope of the appended claims.

The invention claimed is:

1. A launch device connected to an input member and an output member comprising:
   a planetary gear set having a first member, a second member, and a third member; wherein an input member and an output member are operatively connectable for rotation with different ones of the members of the planetary gear set; and
   a centripetal clutch operatively connecting two of the members of the planetary gear set and configured to transmit torque with a torque capacity that decreases as a difference between the speed of rotation of the output member and the speed of rotation of the input member decreases.

2. The launch device of claim 1, wherein the input member is connected to the first member, the second member is connected with the output member, and the centripetal clutch is connected between the second member and the third member.

3. The launch device of claim 2, wherein the first member is a carrier member, the second member is a ring gear member, and the third member is a sun gear member.

4. A launch device for a vehicle having an engine with an engine output member and a transmission with a transmission input member, the launch device comprising:
   a planetary gear set having a first member, a second member, and a third member, wherein the members of the planetary gear set include a ring gear member, a carrier member, and a sun gear member;
   wherein the engine output member is operatively connectable for rotation with the first member;
   wherein the second member is connected for rotation with the transmission input member; and
   a centripetal clutch having a drive member connected for rotation with one of the members of the planetary gear set and a driven member connected for rotation with another of the members of the planetary gear set; and wherein the centripetal clutch is configured to transmit torque from the drive member to the driven member with a torque capacity that decreases as a difference between the speed of rotation of the third member and the speed of rotation of the second member decreases; and wherein the centripetal clutch is configured to overrun when the another of the members of the planetary gear set rotates faster than the one of the members of the planetary gear set.

5. The launch device of claim 4, wherein the one of the members of the planetary gear set is the second member and the another of the members of the planetary gear set is the third member.

6. The launch device of claim 5, wherein the first member is the carrier member, the second member is the ring gear member, and the third member is the sun gear member.

7. The launch device of claim 5, wherein the centripetal clutch is a first centripetal clutch, and further comprising:
   a second centripetal clutch having a second drive member connected for rotation with the engine output member and a second driven member connected for rotation with the first member; and wherein the second centripetal clutch is configured to transmit torque from the second drive member to the second driven member with a torque capacity that decreases as a difference between the speed of rotation of the second drive member and the speed of rotation of the second driven member decreases; and wherein the second centripetal clutch is configured to overrun when the second driven member rotates faster than the second drive member.

8. The launch device of claim 7, wherein the first member is the carrier member, the second member is the ring gear member, and the third member is the sun gear member.

9. The launch device of claim 4, wherein the centripetal clutch includes:
   a plurality of arms pivotably connected to the drive member; and
   a plurality of springs biasing the plurality of arms toward the drive member with a biasing force predetermined to prevent engagement of the plurality of arms with the driven member when the drive member rotates below a predetermined speed of rotation.

10. A launch device for a vehicle having an engine with an engine output member and a transmission with a transmission input member, the launch device comprising:
   a first set of intermeshing gears; wherein the engine output member is operatively connectable for rotation with a first gear member of the first set of intermeshing gears;
   a first planetary gear set having a first member, a second member, and a third member, wherein the members of the first planetary gear set include a ring gear member, a carrier member, and a sun gear member;
   wherein a second gear member of the first set of intermeshing gears is connected for one of common rotation and rotation at a predetermined ratio with respect to rotation of the first gear member of the first planetary gear set;
   wherein the second member of the first planetary gear set is connected for rotation with the transmission input member;
   a centripetal clutch having a drive member connected for rotation with the third member of the first planetary gear set and a driven member connected for rotation with the second member of the first planetary gear set; and wherein the centripetal clutch is configured to transmit torque from the drive member to the driven member and to the first member of the planetary gear set with a torque capacity that decreases as a difference between the speed of rotation of the third member of the first planetary gear set and the speed of rotation of the engine output member decreases; and wherein the centripetal clutch is configured to overrun when the engine output member rotates faster than the third member of the first planetary gear set.

11. The launch device of claim 10, wherein the centripetal clutch is a first centripetal clutch, and further comprising:
   a second centripetal clutch having a second drive member connected for rotation with the engine output member and a second driven member connected for rotation with the first gear member of the first set of intermeshing gears; and wherein the second centripetal clutch is configured to transmit torque from the second drive member to the second driven member with a torque capacity that decreases as a difference between the speed of rotation of the second drive member and the speed of rotation of the second driven member decreases; and wherein the second centripetal clutch is configured to overrun when the second driven member rotates faster than the second drive member.

12. The launch device of claim 10, wherein the first set of intermeshing gears is a second planetary gear set; wherein the first gear member of the first set of intermeshing gears is a carrier member of the second planetary gear set; wherein the second member of the second set of intermeshing gears is a ring gear member of the second planetary gear set; and wherein the first set of intermeshing gears includes a sun gear member grounded to a stationary member and meshing with planet gears supported for rotation by the carrier member of the second planetary gear set.

13. The launch device of claim 12, wherein the first member of the first planetary gear set is the ring gear member of the first planetary gear set; wherein the second member of the first planetary gear set is the carrier member of the first planetary gear set; and wherein the third member of the first planetary gear set is the sun gear member.

14. The launch device of claim 12, wherein a thrust bearing transmits torque from the first centripetal clutch to engage the carrier member of the second planetary gear set with the carrier member of the first planetary gear set.

* * * * *